United States Patent
Wallack et al.

(10) Patent No.: US 8,126,260 B2
(45) Date of Patent: Feb. 28, 2012

(54) SYSTEM AND METHOD FOR LOCATING A THREE-DIMENSIONAL OBJECT USING MACHINE VISION

(75) Inventors: Aaron S. Wallack, Natick, MA (US); David J. Michael, Wayland, MA (US)

(73) Assignee: Cognex Corporation, Natick, MA (US)

( * ) Notice: Subject to any disclaimer, the term of this patent is extended or adjusted under 35 U.S.C. 154(b) by 1038 days.

(21) Appl. No.: 11/754,948

(22) Filed: May 29, 2007

(65) Prior Publication Data

US 2008/0298672 A1 Dec. 4, 2008

(51) Int. Cl.
*G06K 9/00* (2006.01)
(52) U.S. Cl. ........................................ 382/154
(58) Field of Classification Search ................ 382/154, 382/216, 209, 291, 103, 276, 294; 345/419
See application file for complete search history.

(56) References Cited

U.S. PATENT DOCUMENTS

| | | |
|---|---|---|
| 3,727,034 A | 4/1973 | Pope |
| 3,779,178 A | 12/1973 | Riseley, Jr. |
| 4,000,400 A | 12/1976 | Elder |
| 4,303,851 A | 12/1981 | Mottier |
| 4,382,255 A | 5/1983 | Pretini |
| 4,799,243 A | 1/1989 | Zepke |
| 4,847,485 A | 7/1989 | Koelsch |
| 4,970,653 A | 11/1990 | Kenue |
| 4,998,209 A | 3/1991 | Vuichard et al. |
| 5,075,864 A | 12/1991 | Sakai |
| 5,097,454 A | 3/1992 | Schwarz et al. |
| 5,201,906 A | 4/1993 | Schwarz et al. |
| 5,208,750 A | 5/1993 | Kurami et al. |

(Continued)

FOREIGN PATENT DOCUMENTS

EP 0265302 9/1987

(Continued)

OTHER PUBLICATIONS

Lepetit, et al. "Point matching as a classification problem for fast and robust object pose estimation", IEEE, pp. 1-7, Jul. 2004.*

(Continued)

*Primary Examiner* — Daniel G Mariam
(74) *Attorney, Agent, or Firm* — William A. Loginov

(57) ABSTRACT

This invention provides a system and method for determining position of a viewed object in three dimensions by employing 2D machine vision processes on each of a plurality of planar faces of the object, and thereby refining the location of the object. First a rough pose estimate of the object is derived. This rough pose estimate can be based upon predetermined pose data, or can be derived by acquiring a plurality of planar face poses of the object (using, for example multiple cameras) and correlating the corners of the trained image pattern, which have known coordinates relative to the origin, to the acquired patterns. Once the rough pose is achieved, this is refined by defining the pose as a quaternion (a, b, c and d) for rotation and a three variables (x, y, z) for translation and employing an iterative weighted, least squares error calculation to minimize the error between the edgelets of trained model image and the acquired runtime edgelets. The overall, refined/optimized pose estimate incorporates data from each of the cameras' acquired images. Thereby, the estimate minimizes the total error between the edgelets of each camera's/view's trained model image and the associated camera's/view's acquired runtime edgelets. A final transformation of trained features relative to the runtime features is derived from the iterative error computation.

13 Claims, 9 Drawing Sheets

U.S. PATENT DOCUMENTS

| | | | |
|---|---|---|---|
| 5,301,115 A | 4/1994 | Nouso | |
| 5,387,768 A | 2/1995 | Tzard et al. | |
| 5,432,712 A | 7/1995 | Chan | |
| 5,519,784 A | 5/1996 | Vermeulen et al. | |
| 5,529,138 A | 6/1996 | Shaw et al. | |
| 5,555,312 A | 9/1996 | Shima et al. | |
| 5,559,551 A | 9/1996 | Sakamoto et al. | |
| 5,565,918 A | 10/1996 | Homma et al. | |
| 5,581,250 A | 12/1996 | Khvilivitzky | |
| 5,581,625 A | 12/1996 | Connell et al. | |
| 5,642,106 A | 6/1997 | Hancock et al. | |
| 5,706,355 A | 1/1998 | Raboisson et al. | |
| 5,742,037 A | 4/1998 | Scola et al. | |
| 5,859,924 A | 1/1999 | Liu et al. | |
| 5,866,887 A | 2/1999 | Hashimoto et al. | |
| 5,880,782 A | 3/1999 | Koyanagi et al. | |
| 5,917,937 A | 6/1999 | Szeliski et al. | |
| 5,918,196 A | 6/1999 | Jacobson et al. | |
| 5,960,125 A | 9/1999 | Michael et al. | |
| 5,961,571 A | 10/1999 | Gorr et al. | |
| 5,978,080 A | 11/1999 | Michael et al. | |
| 5,978,502 A | 11/1999 | Ohashi | |
| 5,978,521 A | 11/1999 | Wallack et al. | |
| 5,995,649 A | 11/1999 | Marugame | |
| 6,005,965 A | 12/1999 | Tsuda et al. | |
| 6,026,172 A | 2/2000 | Lewis, Jr. et al. | |
| 6,028,626 A | 2/2000 | Aviv et al. | |
| 6,081,619 A | 6/2000 | Hashimoto et al. | |
| 6,137,893 A | 10/2000 | Michael et al. | |
| 6,166,811 A | 12/2000 | Long et al. | |
| 6,173,070 B1 | 1/2001 | Michael et al. | |
| 6,195,102 B1 | 2/2001 | McNeil et al. | |
| 6,205,233 B1 | 3/2001 | Morley et al. | |
| 6,205,242 B1 | 3/2001 | Onoguchi et al. | |
| 6,215,898 B1 | 4/2001 | Woodfill et al. | |
| 6,226,396 B1 | 5/2001 | Marugame et al. | |
| 6,295,367 B1 | 9/2001 | Crabtree et al. | |
| 6,297,844 B1 | 10/2001 | Schatz et al. | |
| 6,301,396 B1 | 10/2001 | Michael | |
| 6,301,440 B1 | 10/2001 | Bolle et al. | |
| 6,307,951 B1 | 10/2001 | Tanigawa et al. | |
| 6,308,644 B1 | 10/2001 | Diaz | |
| 6,345,105 B1 | 2/2002 | Nitta et al. | |
| 6,357,588 B1 | 3/2002 | Room et al. | |
| 6,408,109 B1 | 6/2002 | Silver et al. | |
| 6,469,734 B1 | 10/2002 | Nichani et al. | |
| 6,496,204 B1 | 12/2002 | Nakamura | |
| 6,496,220 B2 | 12/2002 | Landert et al. | |
| 6,539,107 B1 | 3/2003 | Michael et al. | |
| 6,594,623 B1 | 7/2003 | Wang et al. | |
| 6,624,899 B1 | 9/2003 | Clark | |
| 6,639,624 B1 | 10/2003 | Bachelder et al. | |
| 6,658,145 B1 | 12/2003 | Silver et al. | |
| 6,678,394 B1 | 1/2004 | Nichani | |
| 6,681,151 B1 | 1/2004 | Weinzimmer et al. | |
| 6,690,354 B2 | 2/2004 | Sze | |
| 6,701,005 B1 | 3/2004 | Nichani | |
| 6,710,770 B2 | 3/2004 | Tomasi et al. | |
| 6,718,074 B1 | 4/2004 | Dutta-Choudhury, et al. | |
| 6,720,874 B2 | 4/2004 | Fufido et al. | |
| 6,724,922 B1 | 4/2004 | Vilsmeier | |
| 6,728,582 B1 | 4/2004 | Wallack | |
| 6,748,104 B1 | 6/2004 | Bachelder et al. | |
| 6,751,338 B1 | 6/2004 | Wallack | |
| 6,751,361 B1 | 6/2004 | Wagman | |
| 6,756,910 B2 | 6/2004 | Ohba et al. | |
| 6,768,509 B1 | 7/2004 | Bradski et al. | |
| 6,771,808 B1 | 8/2004 | Wallack | |
| 6,791,461 B2 | 9/2004 | Oku et al. | |
| 6,798,925 B1 | 9/2004 | Wagman | |
| 6,816,187 B1 | 11/2004 | Iwai et al. | |
| 6,850,646 B1 | 2/2005 | Silver | |
| 6,856,698 B1 | 2/2005 | Silver et al. | |
| 6,903,177 B2 | 6/2005 | Seo et al. | |
| 6,919,549 B2 | 7/2005 | Bamji et al. | |
| 6,940,545 B1 | 9/2005 | Ray et al. | |
| 6,963,661 B1 | 11/2005 | Hattori et al. | |
| 6,999,600 B2 | 2/2006 | Venetianer et al. | |
| 7,003,136 B1 | 2/2006 | Harville | |
| 7,058,204 B2 | 6/2006 | Hildreth et al. | |
| 7,085,622 B2 | 8/2006 | Sadighi et al. | |
| 7,088,236 B2 | 8/2006 | Sørensen | |
| 7,146,028 B2 | 12/2006 | Lestideau | |
| 7,212,228 B2 | 5/2007 | Utsumi et | |
| 7,260,241 B2 | 8/2007 | Fukuhara et al. | |
| 7,356,425 B2 | 4/2008 | Krahnstoever et al. | |
| 7,360,410 B2 | 4/2008 | Steinbichler et al. | |
| 7,373,270 B2 | 5/2008 | Ohashi et al. | |
| 7,382,895 B2 | 6/2008 | Bramblet et al. | |
| 7,414,732 B2 | 8/2008 | Maidhof et al. | |
| 7,471,846 B2 | 12/2008 | Steinberg et al. | |
| 7,538,801 B2 | 5/2009 | Hu | |
| 7,609,893 B2 | 10/2009 | Luo et al. | |
| 7,680,323 B1 | 3/2010 | Nichani | |
| 7,777,300 B2 | 8/2010 | Tews et al. | |
| 2001/0010731 A1 | 8/2001 | Miyatake et al. | |
| 2001/0030689 A1 | 10/2001 | Spinelli | |
| 2002/0039135 A1 | 4/2002 | Heyden | |
| 2002/0041698 A1 | 4/2002 | Ito et al. | |
| 2002/0113862 A1 | 8/2002 | Center et al. | |
| 2002/0118113 A1 | 8/2002 | Oku et al. | |
| 2002/0118114 A1 | 8/2002 | Ohba et al. | |
| 2002/0135483 A1 | 9/2002 | Merheim et al. | |
| 2002/0191819 A1 | 12/2002 | Hashimoto et al. | |
| 2003/0053660 A1 | 3/2003 | Heyden | |
| 2003/0071199 A1 | 4/2003 | Esping et al. | |
| 2003/0164892 A1 | 9/2003 | Shiraishi et al. | |
| 2004/0017929 A1 | 1/2004 | Bramblet et al. | |
| 2004/0045339 A1 | 3/2004 | Nichani et al. | |
| 2004/0061781 A1 | 4/2004 | Fennell et al. | |
| 2004/0153671 A1 | 8/2004 | Schuyler et al. | |
| 2004/0218784 A1 | 11/2004 | Nichani et al. | |
| 2004/0234118 A1 | 11/2004 | Astrom et al. | |
| 2005/0074140 A1 | 4/2005 | Grasso et al. | |
| 2005/0089214 A1 | 4/2005 | Rubbert et al. | |
| 2005/0105765 A1 | 5/2005 | Han et al. | |
| 2007/0081714 A1 | 4/2007 | Wallack et al. | |
| 2007/0127774 A1 | 6/2007 | Zhang et al. | |
| 2010/0166294 A1 | 7/2010 | Marrion | |

FOREIGN PATENT DOCUMENTS

| | | |
|---|---|---|
| EP | 0341122 | 4/1989 |
| EP | 0847030 | 6/1998 |
| EP | 0706062 | 5/2001 |
| EP | 0817123 | 9/2001 |
| FR | 25980119 | 10/1987 |
| JP | 8-201021 | 8/1996 |
| JP | 2004-504077 | 2/2004 |
| JP | 2004-239747 | 8/2004 |
| JP | 2005-534026 | 11/2005 |
| WO | 9511491 | 4/1995 |
| WO | 9631047 | 3/1996 |
| WO | 9638882 | 12/1996 |
| WO | 9808208 | 7/1998 |
| WO | 0175809 | 10/2001 |
| WO | 0248971 | 6/2002 |
| WO | 02095692 | 11/2002 |
| WO | 2008147355 | 12/2008 |
| WO | 2010077524 | 7/2010 |

OTHER PUBLICATIONS

P. Wunsch et al., "Real-Time Pose Estimation of 3-D Objects from Camera Images Using Neural Networks", Apr. 2007, pp. 3232-3237, Publisher: IEEE, Published in: Albuquerque, US.

Stephane Lavalee et al., "Recovering the Position and Orientation of Free-Form Objects from Image Contours Using 3D Distance Maps", Apr. 17, 1995, pp. 113, vol. 17, No. 4, Publisher: IEEE, Published in: New York, US.

P. Wunsch et al., "Registration of CAD-Models to Images by Iterative Inverse Perspective Matching", 1996, pp. 78-83, Publisher: IEEE, Published in: Wessling, DE.

O.D. Faugeras et al., "The Representation, Recognition, and Locating of 3-D Objects", 1986, pp. 27-52, vol. 5, No. 3, Publisher: Massachusetts Institute of Technology, Published in: Pittsburgh, US.

Danilidis, K, Hand-Eye Calibration Using Dual Quaternions, The International Journal of Robotics Research, vol. 18, No. 3, Mar. 1999, pp. 286-298.

Dhond, et al., Structure from Stereo—A Review, IEEE Transactions on Systems, Man, and Cybernetics, vol. 19 No. 6 Publication Date Dec. 1989.

Faugeras, et al., The Representation, Recognition, and Locating of 3-D Objects, vol. 5, No. 3, Publisher Massachusetts Institute of Technology Ref. pp. 27-52, Publication Date 1986.

Lavalee, Stephane, et al., Recovering the Position and Orientation of Free-Form Objects from Image Contours Using 3D Distance Maps, vol. 17, No. 4, IEEE, published in New York, Ref. pp. 378-382, Publication Date Apr. 17, 1995.

Schmidt, et al., Vector Quantization Based Data Selection for Hand-Eye Calibration, VMV 2004, Stanford, USA, Nov. 16-18, 2004, 8 pages.

Schmidt, et al., Robust Hand-Eye Calibration of an Endoscopic Surgery Robot Using Dual Quaternions, Pattern Recognition, Proceedings of the 25th Dagm Symposium, Magdeburg, Germany, Sep. 2003, pp. 548-556.

Stein, et al., Monitoring Activities from Multiple Video Streams Establishing a Common Coordinate Frame, Massachusetts Institute of Technology, Ref. pp. 1-23, Publication Date Apr. 1999.

Strobl, et al., Optimal Hand-Eye Calibration, Proceedings of the 20069 IEEE/RSJ International Conference on Intelligent Robots and Systems, Oct. 9-15, 2006, Beijing, China, pp. 4647-4653.

Wunsch, P., et al., Real-Time Pose Estimation of 3-D Objects from Camera Images Using Neural Networks Citation IEEE, Published in Albuquerque, Ref. pp. 3232-3237, Publication Date Apr. 2007.

Wunsch, P., et al., Registration of CAD-Models to Images by Interactive Inverse perspective Matching, IEEE, published in Wessling, Ref. pp. 78-83, Publication Date 1996.

Zhang, Zhengyou, A Flexible New Technique for Camera Calibration, Publisher Microsoft Research, published in Redmond, Washington, Ref. pp. 2-21, Publication Date Dec. 2, 1998.

International Search Report for PCT/US06/39324, Jul. 26, 2007.

Japanese application No. 2008-534751, Final Rejection, Sep. 10, 2010.

Japanese application No. 2008-534751, Response to Final Rejection, Feb. 9, 2011.

Burschka, et al., Scene Classification from Dense Disparity Mapis in Indoor Environments, Proceedings of ICPR 2002.

Canesta, Inc., Development Platform—DP200, Electronic Perception Technology—Real-time single chip 3D imaging, 11005-01 Rev 2, Jul. 12, 2004.

Cedes, News from the CEDES World, 2009.

Csem SA, Swiss Ranger SR-2 Datasheet, CSEM Technologies for innovation, www.csenn.ch, innaging@csem.ch, Bandenerstrasse 569, CH 8048, Zurich, Switzerland, 2004.

Gluckman, Joshua, et al, Planar Catadioptric Stereo: Geometry and Calibration, IEEE, 1999.

Gurovich, Alexander, et al, Automatic Door Control using Motion Recognition, Technion, Israel Institute of Technology, Aug. 1999.

Jain, et al, Machine Vision, Chapter 11—Depth, MIT Press and McGraw-Hill Inc. 1995, pp. 289-297.

Kalman, R. E., A New Approach to Linear Filtering and Prediction Problems, Transactions of the ASME, The Journal of Basic Engineering, 8, pp. 35-45, 1960.

Kanade, T., et al, A Stereo Machine for Video-rate Dense Depth Mapping and Its New Applications, Proc. IEEE Computer Vision and pattern Recognition, pp. 196-202, 1996.

Norris, Jeffery, Face Detection and Recognition in Office Environments, Department fo Electrical Engineering and Computer Science, Massachusetts Institute of Technology, May 21, 1999.

Pilz GmbH & Co., Safe camera system SafetyEye, http://www.pilz.com/products/sensors/camera/f/safetyeye/sub/applications/index.en.jsp. 2007.

Pollard, Stephen P., et al, A Stereo Correspondence Algorithm using a disparity gradient limit, Perception, vol. 14, 1985.

Prati, A., et al, Detecting Moving Shadows: Algorithms and Evaluations, IEEE Transactions on Pattern Analysis and Machine Intelligence, vol. 25, No. 7, pp. 918-23, 2003.

Roeder-Johnson Corporation, Low-cost, Broadly-Available Computer/Machine Vision Applications Much Closer with New Canesta Development Platform, Press Release, San Jose, CA, Aug. 10, 2004.

Tsai, R. Y., A Versatile Camera Calibration Technique for High-Accuracy 3D Machine vision Metrology using off-the-shelf TV Cameras and Lenses, IEEE J. Robotics and Automation, vol. 3, No. 4, Aug. 1987.

Weng, Agglomerative Clustering Algorithm, www.speech.sri.com, 1997.

Zhang, Z., A Flexible New Technique for Camera Calibration, Technical Report MSR-TR-98-71, Microsoft Research, Microsoft Corporation, pp. 1-22, Mar. 25, 1996.

* cited by examiner

SYSTEM AND METHOD FOR LOCATING A THREE-DIMENSIONAL OBJECT USING MACHINE VISION

FIELD OF THE INVENTION

This invention relates to machine vision systems, and more particularly to machine vision systems that locate viewed objects having three-dimensional characteristics.

BACKGROUND OF THE INVENTION

The use of advanced machine vision systems and their underlying software is increasingly employed in a variety of manufacturing and quality control processes. Machine vision enables quicker, more accurate and repeatable results to be obtained in the production of both mass-produced and custom products. Typical machine vision systems include one or more cameras (typically having solid-state charge couple device (CCD) or CMOS-based imaging elements) directed at an area of interest, a frame grabber/image processing elements that capture and transmit CCD images, a computer or onboard processing device, and a user interface for running the machine vision software application and manipulating the captured images, and appropriate illumination on the area of interest.

Many applications of machine vision involve the inspection of components and surfaces for defects that affect quality or determination of the relative position of a part in multiple degrees of freedom with respect to the field of view. Machine vision is also employed in varying degrees to assist in manipulating manufacturing engines in the performance of specific tasks. A particular task using machine vision is visual servoing of robots in which a robot end effector is guided to a target using a machine vision feedback. Other applications also employ machine vision to locate a stationary and/or moving pattern.

The advent of increasingly faster and higher-performance computers has enabled the development of machine vision tools that can perform complex calculations in analyzing the pose of a viewed part in multiple dimensions. Such tools enable a previously trained/stored image pattern to be acquired and registered/identified regardless of its viewed position. In particular, existing commercially available search tools can register such patterns transformed by at least three degrees of freedom, including at least three translational degrees of freedom (x and y-axis image plane and the z-axis) and two or more non-translational degree of freedom (rotation, for example) relative to a predetermined origin.

An object in 3D can be registered from a trained pattern using at least two discrete images of the object with dissimilar poses. There are a number of challenges to registering an object in three-dimensions from trained images using this approach. For example, when non-coplanar object features are imaged, different features of the acquired image undergo different transformations, and thus, a single affine transformation can no longer be relied upon to provide the registered pattern. In addition the object's highlights and shadows "move" as the part is rotated in 3D and the features undergo true perspective projection. Also, any self-occlusions in the acquired image will tend to appear as boundaries in the simultaneously acquired images. This fools the 2D vision system into assuming an acquired image has a different shape than the trained counterpart.

A powerful machine vision tool for registering objects in 2D is the well-known PatMax® system available from Cognex Corporation of Natick, Mass. This system allows the two-dimensional pose of a subject part to be registered and identified quite accurately from a trained pattern, regardless of rotation and scale. Advanced machine vision search tools such as PatMax® also have the ability to take advantage of the previous known position of a search subject or target. This narrows the search area to positions relatively near the last known location. Therefore, searching is relatively faster on the next cycle since a smaller area is searched. In addition, these search tools can tolerate partial occlusion of a pattern and changes in its illumination, adding further to their robustness with respect to less-advanced machine vision approaches.

PatMax® operates by first acquiring a coarse image of the object, and then refining this image using an iterative, reweighted least-squares approximation of the acquired image with respect the trained image that progressively reduces the relative error therebetween with each iteration. That is, the original coarse pose is initially compared to the trained data. The data that appears to match best is reweighted to give that data a higher value in the overall calculation. This serves to remove portions of the image that may represent occlusions, shadows or other inconsistencies, and focusing the analysis upon more-reliable portions of the feature. After reweighting, a least-squares statistical approximation is performed on this data to refine the approximation of location and position of the object in the field of view. After (for example) approximately four iterations, the final position and location is determined with high accuracy.

Two-dimensional (2D) machine vision tools, such as PatMax® are highly robust. It highly desirable to adapt the techniques employed by such tools to provide a machine vision system that could resolve a trained pattern in three dimensions (3D) characterized by as many as six degrees of freedom (x, y and z translational degrees and three corresponding rotational degrees), or more.

SUMMARY OF THE INVENTION

This invention overcomes the disadvantages of the prior art by providing a system and method for determining position of a viewed object in three dimensions by employing 2D machine vision processes on each of a plurality of planar faces (or other portions of the image object image that can rotate with the origin and be divided into edgelets) of the object, and thereby refining the location of the object. The object can be at a previously unknown location and orientation or can be at a relatively known location (e.g. on the end effector of a robot that includes position feedback). First a rough pose estimate of the object is derived. This rough pose estimate can be based upon (for example) location data for an end effector holding the object, a comparison of the acquired object image to a table of possible silhouettes of the trained object in different orientations, or by acquiring a plurality of planar face poses of the object (using, for example multiple cameras) and correlating the corners of the trained image pattern, which have known coordinates relative to the origin, to the acquired patterns. Once the rough pose is achieved, this is refined by defining the pose as a quaternion (a, b, c and d) for rotation and a three variables (x, y, z) for translation and employing a weighted, least squares calculation to minimize the error between the defined edgelets of trained model image and the acquired runtime edgelets. In the illustrative embodiment, the overall, refined/optimized pose estimate incorporates data from each of the cameras' (or a single camera, acquiring multiple views) acquired images. Thereby, the estimate minimizes the total error between the edgelets of each camera's/view's trained model image and the associated camera's/view's acquired runtime edgelets.

In the illustrative embodiment, the pose estimate is used to determine which 3D model point of the trained image corresponds to each acquired runtime image edgelet. 3D model points are collected into discrete coplanar sets and a look-up table of coordinate values is constructed to find the closest model point corresponding to each image edgelet with each lookup table plane. Each plane of model features then is intersected by an imaginary ray that extends from the camera through the runtime image and the plane of model points. This provides the 2D position on the plane of model features. Using a correspondence lookup table, the model feature closest to the ray is determined. The model edgelet's angle is estimated through the pose. The system then confirms that the edges of the model are consistent with those of the runtime image. The error between the plane through the runtime edgelet and the camera origin versus the center point of the trained, model edgelet is considered. The error is then characterized as dot product between a plane normal to the runtime edgelet plane and the runtime edgelet point. A transformation of the trained edgelets relative to the runtime edgelets (as a whole) is derived using a refinement procedure. This refinement procedure computes a minimum sum-squared error between the edgelets and associated center points of training edgelets for the planes. The error is further refined by weighting the results for each edgelet and recomputing the sum-squared error for each trained/runtime edgelet with the new weight, over a given number of iterations (e.g. using an iterative reweighted least squares technique). Upon completion of a predetermined number of iterations a final, highly accurate transformation of the trained features relative to the runtime features is obtained from the error results.

In an illustrative embodiment, the system can be trained using the machine vision procedures described above that are used to establish the rough pose of at least two discrete views of an appropriate feature or face. In various implementations, two views of a single, discrete, planar face can be acquired, using two or more different cameras. Alternatively, the two or more cameras can acquire views of different planar faces, or one camera (using, for example, a fish eye lens) can acquire two different views of two different planar faces or a single planar face.

In an alternate embodiment, the system and method can take advantage of object silhouette data, whereby a plurality of silhouettes of object features are stored with position data from images of a training object acquired at a number of differing orientations. Silhouettes of the runtime object are acquired and compared to the training silhouettes to derive the best matching pose.

A method for registering an object in three dimensions according to an embodiment of this invention includes acquiring training images of an object used for training with one or more cameras at training time and, at runtime, subsequently acquiring runtime images of an object to be registered at runtime with the one or more cameras. A three-dimensional pose transformation between the pose of the object used training time and the pose of the object to be registered at runtime is then determined. This determination includes (a) defining features in each of the runtime images as three-dimensional rays through an origin of each of the one or more camera's, respectively, (b) matching the three-dimensional rays to corresponding runtime features from the training images, and (c) computing an optimal pose estimate which maps the training features onto the corresponding three-dimensional rays of runtime features using iterative, reweighted least squares analysis. The acquiring of training images can be based upon views of at least two planar faces, or like features, on the object.

BRIEF DESCRIPTION OF THE DRAWINGS

The invention description below refers to the accompanying drawings, of which.

DETAILED DESCRIPTION

I. Calibration of the Cameras

Figure 1:
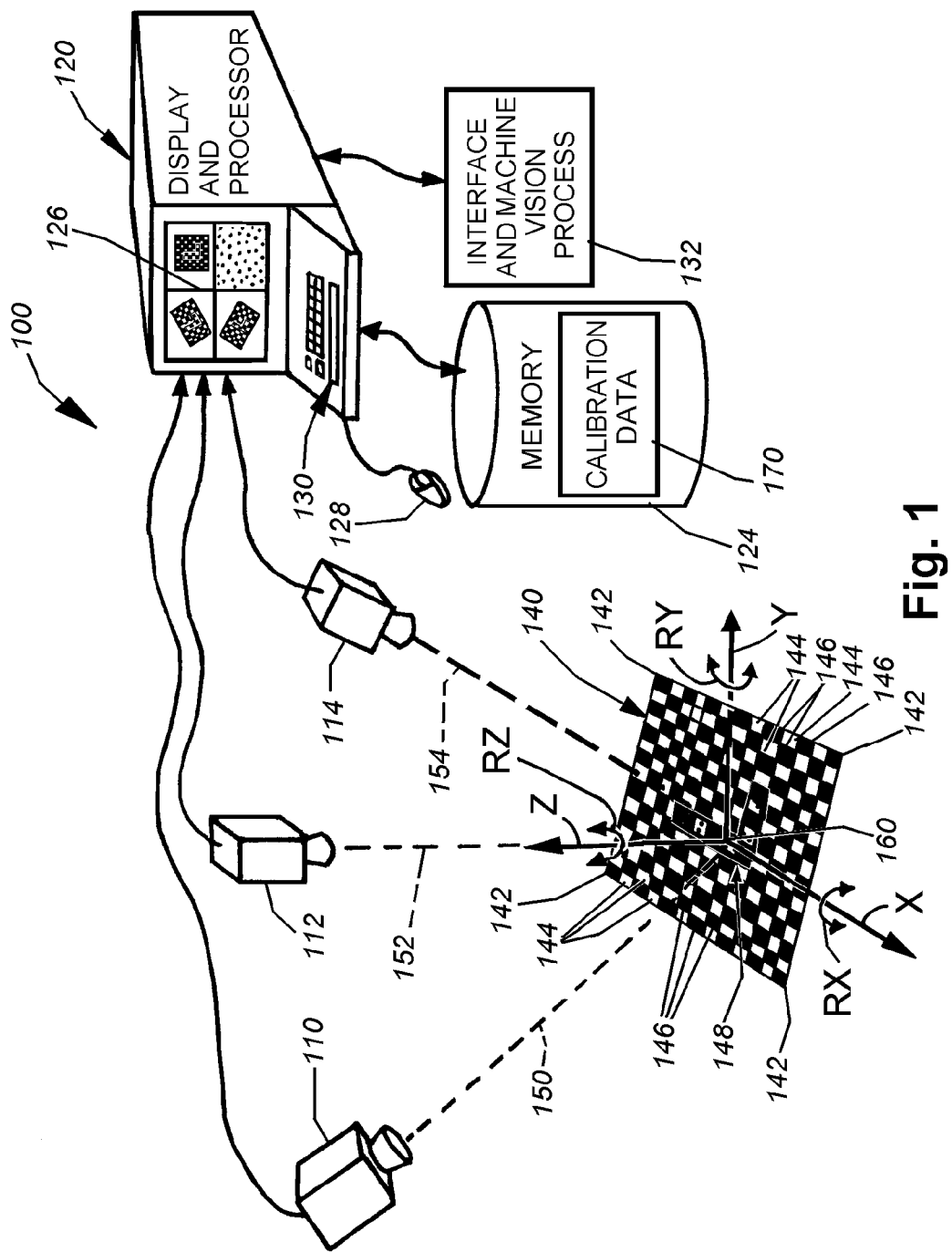
FIG. 1 is a schematic perspective view of an exemplary machine vision arrangement with one or more imaging devices (cameras) interfaced to a processor, and showing an exemplary calibration procedure according to an illustrative embodiment of this invention.

FIG. 1 details an exemplary setup for a machine vision system 100 capable of registering objects in three dimensions (3D) using six degrees of freedom (three translational degrees and three rotational degrees). The system 100 includes a plurality of cameras 110, 112 and 114 in this embodiment that are each oriented to derive a different view of an underlying subject. The number of cameras and their positioning with respect to a subject is highly variable. In alternate embodiments, only two camera's can be employed, or even a single camera with a sufficiently wide field of view, and some inherent distortion (for example a camera equipped with a fish-eye lens) so that, either, at least two discrete poses of a subject can be derived from a single image (if no coarse pose estimate is supplied) or at least four features on the image occur along non-parallel rays (described below) from the camera (if a coarse pose estimate is supplied). For the purpose of this description the term "imaging system" can be used to describe any acceptable camera arrangement. The cameras 110, 112, 114, or imaging system, are operatively connected with a data processor, such as the depicted personal computer 120. The computer 120 includes appropriate interfaces (not shown) for converting electronic, pixelized image data from each of the cameras 110, 112, 114 to image pixel data that can be stored in the online memory (RAM) (not shown) and/or storage (disk) 124. The computer runs various operating system processes that are well-known and, among other functions, support a display 126 and associated user interface (keyboard 128, mouse 130, etc.). The user interface allows the operator of the system 100 to interact with it during setup (calibration) and runtime. The interface and machine vision processes are contained in software processes 132 that are loaded into the computer's online memory as needed. The working data from the cameras is also stored and handled by the computer's online memory in association with the machine vision application (132). The processes employed by the application are described further below.

It should be clear that a variety of interfaces and processors can be employed in alternate embodiments. For example, disconnectable and or portable interfaces can be used for setup and/or runtime operation. Likewise, the processor can be an onboard processor within the imaging system and can include a solid state, non-volatile storage memory and processes that are (in whole or in part) resident on a specialized chipset, including, for example, one or more application-specific integrated circuit(s) (ASIC(s)). Thus, as defined herein, the term machine vision "processor" should be taken broadly to include a variety of systems that are interfaced with the imaging system and can perform the machine vision processes described herein.

As shown in FIG. 1, the system 100 is initially calibrated so that the cameras are properly registered with respect to a common three-dimensional (3D) coordinate system including position of the frame origin and direction and scale of the orthogonal frame axes. As shown a calibration plate 140 is placed in a fixed position while each camera 110, 112, 114 acquires an image of the plate. The plate in the embodiment defines a square boundary with four corners 142. Within the plate is a plurality of tessellated light and dark squares 144, 146. The center of the plate includes a fiducial 148 that can be any acceptable shape capable of resolution in multiple dimensions. In this embodiment, the fiducial 148 is an L-shaped region that encompasses a plurality of individual tessellated squares 144, 146. The fiducial typically defines the origin 160 of a three orthogonal axes, X, Y and Z. Each axis defines a direction of translation within the space of the cameras. Likewise, a rotational degree of freedom RX, RY and RZ is disposed about each respective axis X, Y and Z. Each camera 110, 112, 114 is oriented along a different, respective, optical axis 150, 152, 154 (a line perpendicular to the camera's image plane), and is registered with respect to the common origin 160 of the axes X, Y, and Z.

The system application, thus, stores calibration data 170 in the memory 124 and online. This data is used by the system to allow any image derived by a given camera in the imaging system to register that image within a common three-dimensional coordinate system as shown. The system employs well-known calibration techniques to provide such a common coordinate system based upon a single, viewed calibration plate and fiducial. By way of further background, a discussion of camera calibration and use of calibration plates can be found in the CVL Library under the general heading Multiple Field of View Camera Calibration and or "Checkerboard" calibration, commercially available from Cognex Corporation of Natick, Mass. In addition, a discussion of mutually calibrated cameras using the same calibration plate is provided in commonly assigned U.S. patent application Ser. No. 11/246,024, entitled METHODS AND APPARATUS FOR PRACTICAL 3D VISION SYSTEM by Aaron Wallack, et al., the teachings of which are expressly incorporated herein by reference.

II. Training and Runtime Image Acquisition

Figure 2:
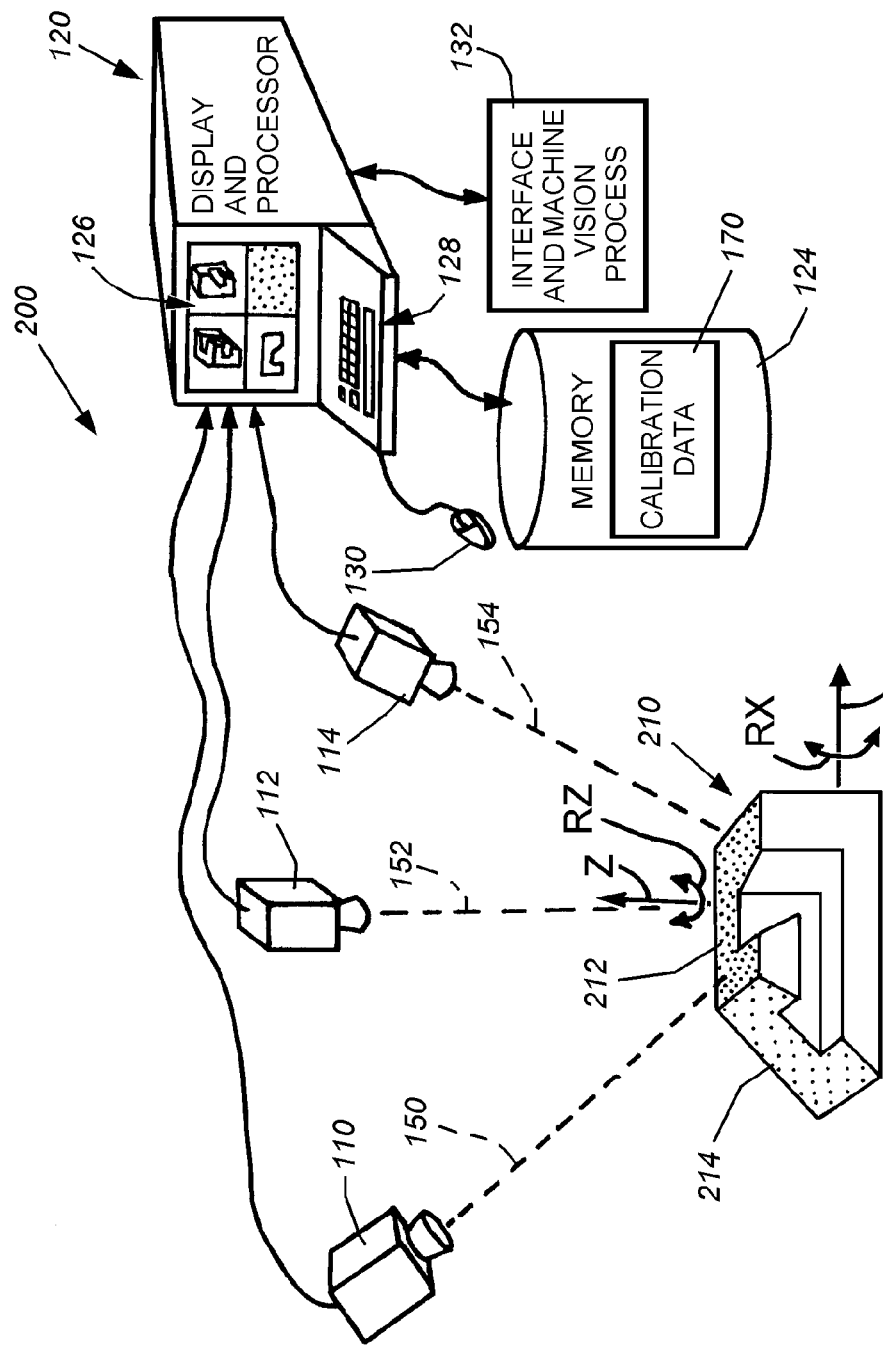
FIG. 2 is a schematic perspective view of the machine vision arrangement of FIG. 1 showing an exemplary training procedure for recognizing a three-dimensional object and/or subsequent runtime registration procedure according to an illustrative embodiment of this invention.

Referring now to FIG. 2, an arrangement 200 used for registration of a viewed object 210 for training and subsequent runtime operation is now shown in further detail. For the purposes of the illustrative embodiment to be effectively registered, the object 210 must undergo a single rigid transform in all applicable degrees of freedom. That is, the object cannot be deformable nor have any internal links. In addition the object should have at least one surface that can be rotated in one or more degrees about the origin in a manner that is registerable. This surface should be defined by planar boundaries or texture that can be resolved by the system 100 into a plurality of edgelets. While the object may include self-occluding boundary curves, these are ignored for the purposes of registration. Such surfaces are generally referred to by the simplified term "planar pattern" or "planar face." In this embodiment at least two planar patterns should be acquired to allow registration of the object in the desired six degrees of freedom. In alternate embodiments, a single planar pattern, viewed from different vantage points or two different orientations can be acquired. This can be accomplished using two or more cameras, or a single camera with an ability to create two images with differing viewpoints (for example, a fish eye lens).

As shown in FIG. 2, the subject object includes two exposed planar faces 212, 214 of interest for registration purposes. These faces are somewhat complex and can result in some self-occlusion of features for certain acquired poses. Note that the viewing of two different faces with two discrete cameras is only illustrative of a variety of possible arrangements. In alternate embodiments, the system may acquire multiple images from a single planar face.

In training, the object image is acquired by the imaging system (110, 112 and 114). Again the number of cameras is highly variable and the images of cameras 110 and 114 are discussed herein, without particular reference to the image of camera 112. The techniques for registering a pattern in three dimensions (3D) described hereinbelow in can be employed at training time to derive the three-dimensional shape of the object 210. In an automated training embodiment, the object 210 is imaged to derive at least two simultaneously acquired runtime images while the object remains fixed with respect to the origin and axes, X, Y and Z. It can be assumed the training object 210 generates an affinely transformed image with respect to the model image, and that there exists a weak perspective projection of the image, i.e. the system assumes a linearized approximation of the perspective image.

Alternate training techniques can also be employed. Such techniques can include the use of well-known search tools for resolving edges and surfaces. Conversely, in a manual training embodiment, the user manually inputs the position coordinates for the object's edges and surfaces of interest. This training information is stored in the memory (124) for subsequent use during the runtime registration process. Note that, during training, the user can alternatively manually specify which training edgelets are on the same plane, and then specify that plane. Then the individual training edgelet positions can be determined automatically by intersecting imaginary rays (described further below) from the camera origin through each training edgelet with the specified plane.

III. Estimation of Object Pose in Training and Runtime

Figure 3:
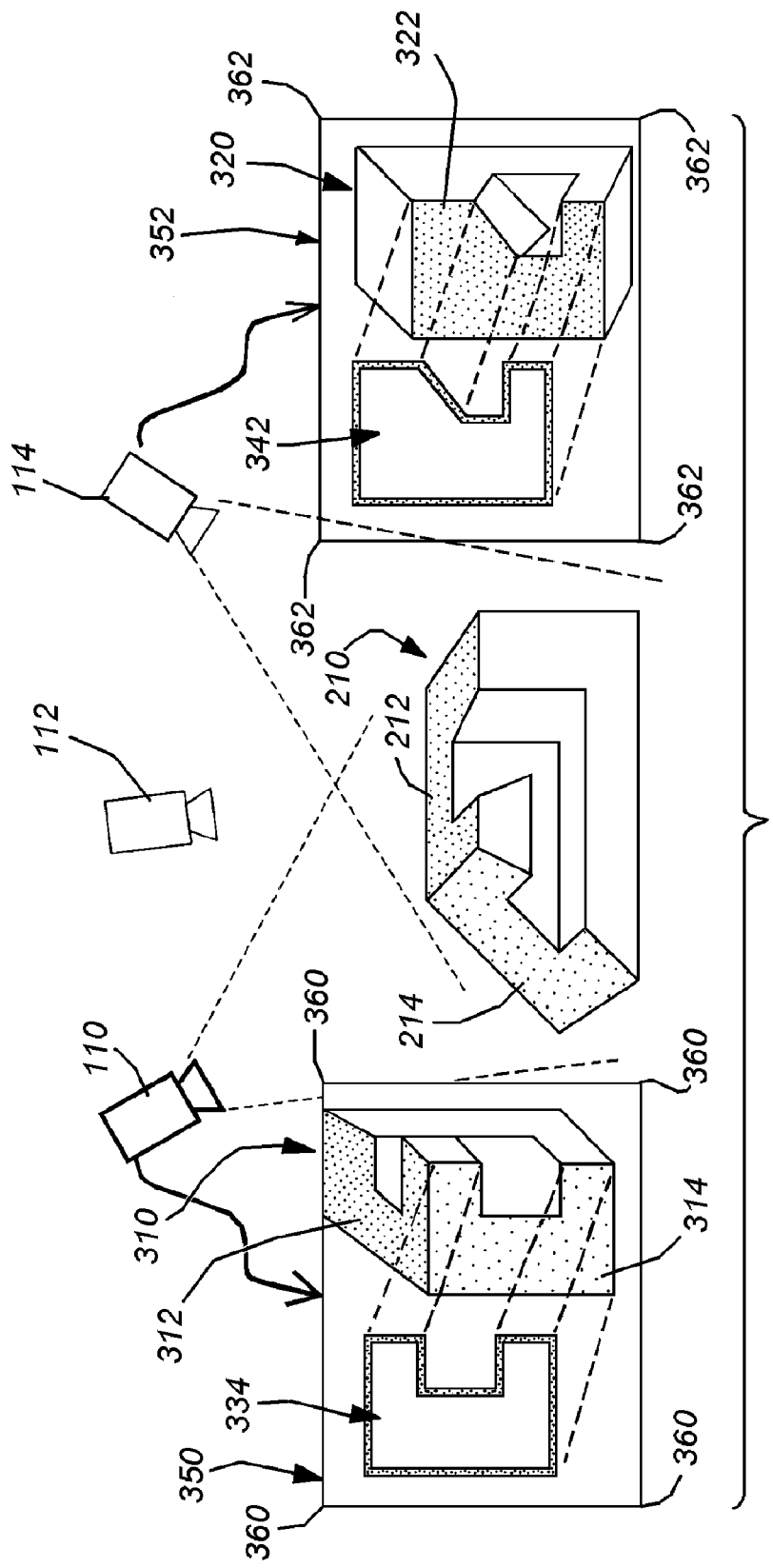
FIG. 3 is a schematic diagram showing the registration of discrete, affinely transformed planar patterns from the object using the 2D machine vision process for training and subsequent runtime location of the object.

Referring to FIG. 3, a multi-part view illustrates how each of the two exemplary cameras 110, 114 derives a different image of the object 210 for both automated training (according to one embodiment) and runtime operation (described below). The camera 110, acquires the image 310. In this image the most prominent planar face is the face 214, which appears as image face 314. The adjoining object face 212 appears as corresponding oblique image face 312. The system may automatically choose the face that provides the least oblique projection. Likewise, the differently oriented camera 114 acquires the image 320, in which the object face 212 is more clearly viewed as image face 322. Note that it is also contemplated that the camera or camera's herein may acquire different images of a single planar face in another implementation of the invention. Both of these images undergo a degree of perspective projection. The above-described PatMax 2D, and available other vision systems that use similar techniques, are a very effective and robust tools for finding affinely transformed patterns in images. In this case, each depicted planar image pattern 314 and 322 is a 3D-rotated version of the corresponding model 334 and 342, which appears as an affine transformation of the model. Thus, the system assumes that the apparent affine approximation of the actual perspective projection sufficiently approximates the perspective projection which is actually occurring. Note that the system need not choose the most prominent face for registration. However, this may render the process more reliable.

In both automated and manual training modes, the training model images of the object 210 are bounded by rectangular/square subwindows 350 and 352, having respective corners 360, 362 that are a subset of each camera's overall field of view. The corners 360, 362 define a known area of this overall camera field. The spatial coordinates of each subwindow are known by the system via the calibration process.

After a trained model image data for the object 210 is generated by manual or automated processes, the system can undertake the runtime registration process. First, as again shown in FIG. 2, the (now) runtime object 210 is imaged to derive at least two simultaneously acquired runtime images 310, 320, while the object remains fixed with respect to the origin and axes, X, Y and Z. Perspective effects are again linearized as described above.

IV. Registration Computation

Figure 4:
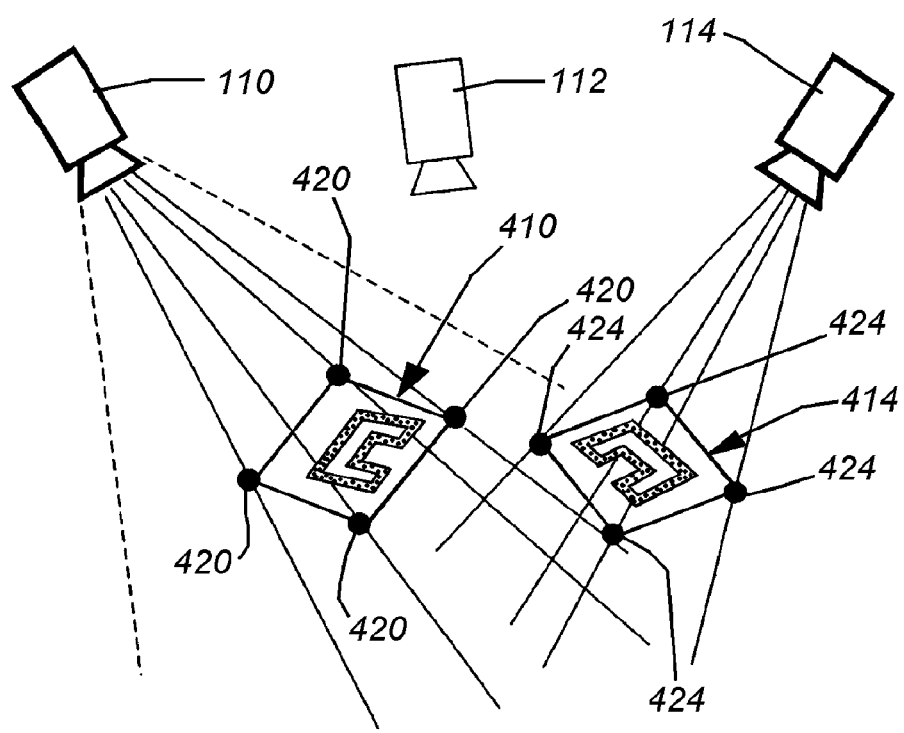
FIG. 4 is a schematic diagram showing a graphical representation of the combination of a plurality of 2D poses of planar faces of the object to generate an overall 3D pose of the object.

As described above, the system has knowledge of the 3D positions corresponding to the corners 360, 362 of the training pattern subwindows 350, 352. Referring to FIG. 4, the acquired runtime poses 410, 414 and their associated subwindow corners 420, 424, the system can extrapolate the 2D positions corresponding to the corners 360, 362 of the training pattern subwindows. The system can then compute the object pose from sets of 2D image points (corners 360, 362 of training subwindows) and corresponding 3D points (3D positions corresponding to the corners 360, 362 of the training subwindows in the object's home position). The system can then proceed to compute the runtime image's 3D poses from 2D image points which correspond to 3D model positions.

Figure 5:
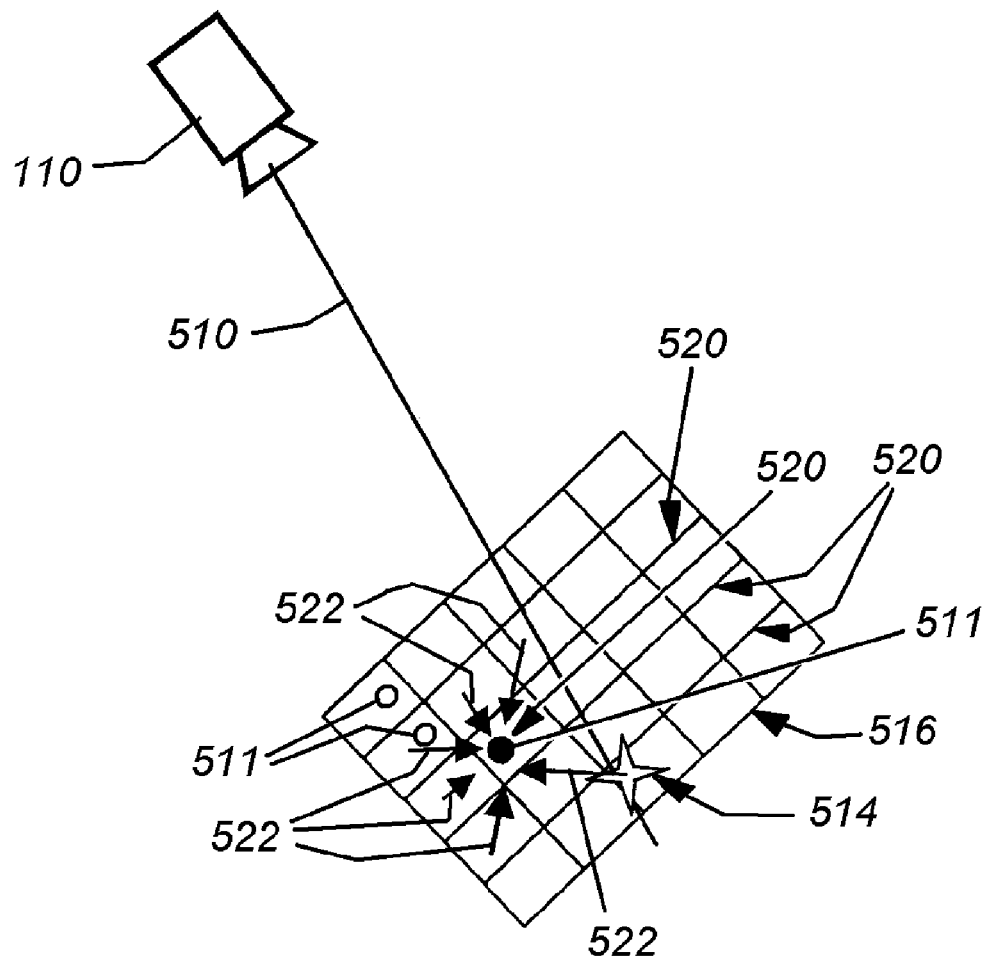
FIG. 5 is a schematic diagram showing a graphical representation of a procedure for corresponding a set of trained 3D model data, grouped into planes with edgelets of the acquired image of a runtime object and a ray projected between the camera, plane and runtime edgelet.

As will be described further below, with reference to FIG. 5, the 2D image positions correspond to rays through each camera's origin. Thus, finding a pose which maps the 2D image points to the corresponding 3D model points is analogous to finding a pose which maps the 3D model points onto the rays corresponding to the 2D image points.

The computation procedure employs a function which maps from 3D pose to sum squared error, and then finding the pose with minimum error relative to the training model image. The 3D poses are characterized by quaternions, which are four numbers (a, b, c, d) that characterize a rigid 3D rotation by quadratic expressions (rather than trigonometric expressions). This form of expression is more efficiently employed by a computer processor. Note that quaternions require that $a^2+b^2+c^2+d^2=1$. The rotation matrix corresponding to the quaternions (a, b, c, d) is shown below:

$$\begin{vmatrix} a^2+b^2-c^2-d^2 & 2bc-2ad & 2ac+2bd \\ 2ad+2bc & a^2+c^2-b^2-d^2 & 2cd-2ab \\ 2bd-2ac & 2ab+2cd & a^2+d^2-c^2-b^2 \end{vmatrix}$$

Using quaternions, the system constructs a polynomial expression characterizing the error in terms of (a, b, c, d, X, Y, Z), where a, b, c, d represent the rotation and X, Y, Z (also referred to as respective translation variables tx, ty, tz) represent the translation. The Levenberg-Marquardt Algorithm (LMA) is used in this embodiment to find the configuration which induces minimum error.

Note that the system only solves for six variables at a time, while there exist a total of seven variables—rotation variables a, b, c, d, and translation variables tx, ty, tz. Since the above process has yielded the approximate, coarse pose estimate, the system can enforce that one of the four (a, b, c, d) variables is fixed at 1 (for example the system can choose one of the a, b, c, or d variables which has maximal magnitude at the coarse pose estimate). The solution is mainly concerned with the ratios between a, b, c, and d; i.e., the result remains constant if all of a, b, c, and d are multiplied by the same constant value. Thus, by fixing one of the a, b, c, d values, the primary restriction is that the value that is fixed does not correspond to 0 in the optimal solution. For this reason, the variable having the maximum magnitude of a coarse pose candidate (if one exists) is selected to be equal to 1.

If an initial coarse pose estimate is unavailable, the system can alternatively run four separate solvers where a, b, c, and d are each set to 1 respectively. This is because it is difficult to numerically minimize an error function while simultaneously enforcing the constraint ($a^2+b^2+c^2+d^2=1$). Rather, either a, b, c, or d is set to 1 and then the remaining six variables are solved-for. The computation is described further below.

The system can now determine which runtime image featurelet/edgelet corresponds to which 3D model image point. Given a pose estimate, the system can efficiently employ lookup tables to determine which 3D model point corresponds to each image featurelet or edgelet. A featurelet/edgelet is a small segment of a defining boundary of a planar face or other registered feature on the training model image and runtime object image. The 3D model points can be collected into distinct coplanar sets from which a lookup table is constructed, which finds the "closest" model point to every point in the plane. Then, given the pose, the projection corresponding to each image edgelet is intersected with each lookup table plane. Then, the system performs a look up from the table for the "closest" model point.

As discussed above, and referring to FIG. 5, for each model plane 510 of model features 511, the system intersects an imaginary ray 510 through the runtime image featurelet/edgelet 514, camera (110), and that plane 516. This projection provides a 2D position (within a 2D coordinate system as symbolized by the grid lines 520) on the plane 516 of model features. The system can employ a conventional correspondence lookup table to determine the model feature 520 closest (symbolized by arrows 522) to this ray 510. Such a 2D lookup table can be constructed as a Voronoi table based on the model points similar to the manner described by D. W. Paglieroni in "Distance Transforms" published in Computer Vision, Graphics, and Image Processing, 54:56 (74, 1992) or the manner described by D. W. Paglieroni in "A Unified Distance Transform Algorithm and Architecture" published in *Machine Vision and Applications* 47-55, Volume 5, Number 1, December 1992, the teachings of which are herein incorporated by reference. Each entry in the 2D lookup table should record the closest model feature as computed/determined in the Voronoi table. There may be multiple candidate matches (i.e. one closest-point for each model plane), in which all the identified matches (on various model planes) satisfy the feature orientation constraint and any distance constraint (e.g. maximum allowable distance that the system recognizes for determining closeness). The feature orientation constraint relates to the orientation match between the model feature viewed at its current pose and the orientation of the runtime feature—i.e. the system is aware of the 3D direction of the edge at each model point, because it knows the edgelet orientation at each model point and it knows the plane that the model feature resides in. Alternatively, the system can choose to only use the model feature (from all of the candidate planes) which "best matches" the runtime feature. It should be noted that every edgelet can be characterized by a discrete ray, thereby allowing each edgelet to be matched readily with the closest 3D position/model feature for that ray.

V. Training and Registration Procedure Overview

Figure 6:
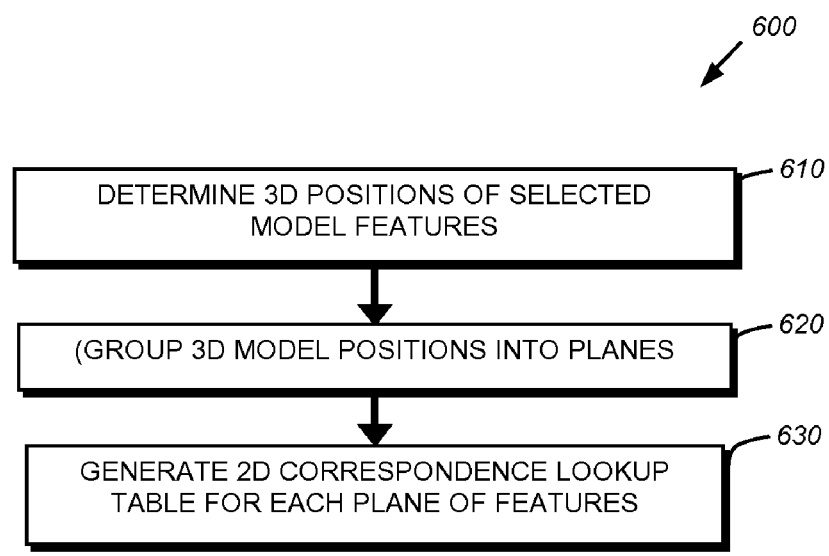
FIG. 6 is a flow diagram of an exemplary system draining procedure in accordance with an illustrative embodiment.
Figure 7:
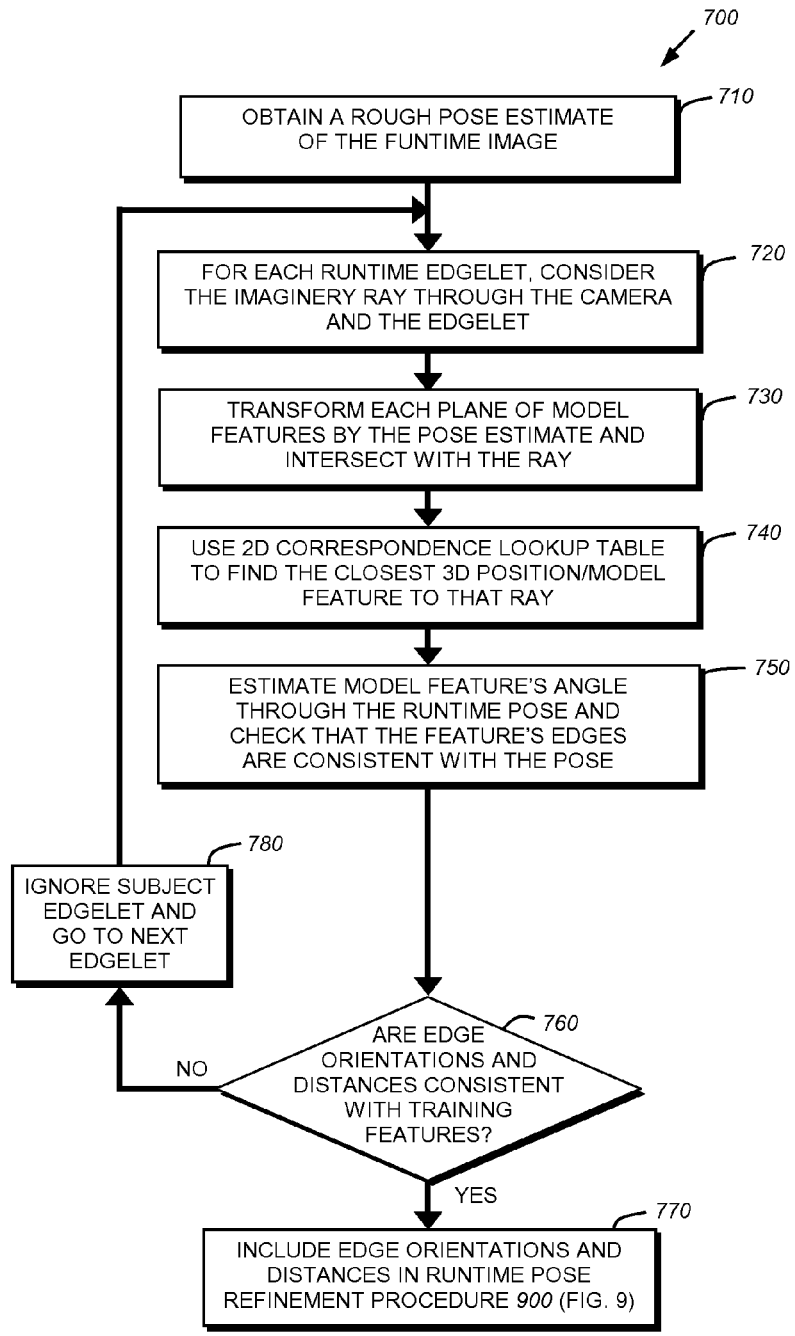
FIG. 7 is a flow diagram of an exemplary runtime object registration procedure in accordance with an illustrative embodiment.

Reference is now made to FIGS. 6 and 7, which respectively show a summary of the procedure 600 for training model features and the basic procedure 700 for subsequently registering objects in accordance with the above description. In the training procedure 600 (FIG. 6), the 3D positions of selected object model features are first determined by manual or automated techniques as described above (step 610). The 3D model features are then grouped into appropriate planes (step 620). Finally, the planes and their associated features are placed into an associated 2D correspondence lookup table that can be used at runtime to register the runtime pose (step 630).

During the runtime procedure 700 (FIG. 7), the system first obtains a rough pose estimate of the runtime image in accordance with the procedures described above (step 710). Each runtime edgelet in the acquired image is then associated with an intersecting imaginary ray from the camera (step 720). Each plane of model features is then transformed in accordance with the pose estimate and intersected with the ray (step 730). Next, the runtime procedure 700 employs the 2D correspondence lookup table established in the training procedure step 630 to locate the closest positioned 3D model feature/point to that ray on a given plane (step 740). Various procedures can be employed for deciding the best candidate point where there is a plurality of planes with a "closest" point. The procedure 700 estimates the model feature's angle through the runtime pose and confirms that the feature's edges are consistent with those of the pose (step 750). If the orientations and distances of the respective edges of the runtime pose and the training features are consistent (decision step 760 and branch 762), then the procedure 700, in step 770, includes the present orientations and distances in the runtime image refinement procedure (steps 910-940 in FIG. 9 below) to determine a more-accurate pose. If the edges are not sufficiently consistent (e.g. they do not meet the angular orientation and/or distance constraints), then the procedure 700 ignores the subject edgelet from which the orientation and distance measurements are derived and moves to the next edgelet to again perform the procedure steps 720-760 on the new edgelet. When all edgelets have been analyzed by the procedure, the procedure 700 ends and any consistent edgelets have been refined.

VI. Refinement of Registration Through Error Contributions of Data

In general, an illustrative refinement procedure for the coarse pose derived above relies on knowledge of the 3D position of each 2D edgelet in the training model. Also, in this embodiment, the refinement procedure may incorrectly register a discrete image edgelet corresponding to a projected 3D position even though that position is self-occluded. In other words, the 3D registration procedure does not concern itself with knowing occluding faces and checking each registered edgelet for occlusion. Rather, the feature as a whole is registered.

Figure 8:
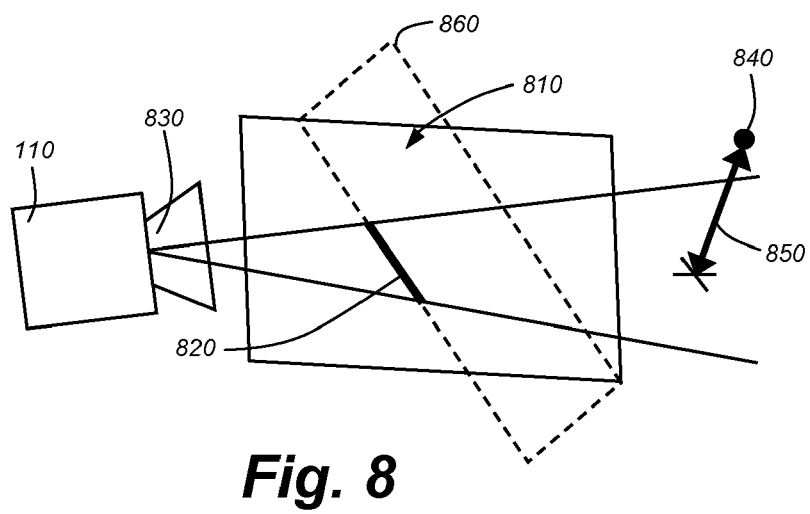
FIG. 8 is a schematic diagram showing n plane containing a runtime edgelet and its relationship to an associated center point of a traintime edgelet for use in refinement of the registered runtime pose.

Referring now, to FIG. 8, the systems refines the registration of runtime images relative to the trained object by taking into consideration the error between the plane 810 through the runtime edgelet 820 (and the camera origin 830) and the center point 840 of the traintime edgelet. This error can be characterized as a distance 850, and is derived for each runtime edgelet corresponding to a traintime edgelet.

Notably, by characterizing the error in this manner, it reduces to a dot product between a plane normal (normal to the runtime edgelet plane) 860 and the runtime edgelet. Thus, the sum squared error can be characterized algebraically as:

$$(\text{RuntimePlaneNormal} \cdot [\text{Matrix for mapping Traintime Points}] * \text{TraintimePosition} - x)^2.$$

VII. Weighted Least Squares Error Computation

The error corresponding to a particular set of data can be characterized by the monomial coefficients of the error expression. As a simplified example, if the error expression was: $2x^2+3x+7$, then the system need track only the coefficient values 2, 3, and 7. As discussed above, quaternions are used to characterize the 3D transformation, i.e. the 3D rotation component of the transformation is characterized by degree two in a, b, c, d, and in degree one in tx, ty, and tz. (also denoted simply as x, y and z). Thereby, the total error between 3D lines to 3D points can be characterized as a rational algebraic expression in terms of a, b, c, d, x, y, and z. Given a set of points and corresponding planes, the system can compute the coefficients of the sum squared error polynomial. Furthermore, the system can incorporate weights for each edgelet and corresponding normal plane to compute coefficients (including the weight data). In particular, the system employs the above-described Levenberg-Marquardt Algorithm (LMA) to determine the pose which induces the minimum squared error. An iterative reweighted least squares techniques is applied to compute the optimal pose estimate. In general, at each iteration, following the computation of a pose estimate, the model features corresponding to the runtime image features are redetermined. In particular, for a given pose, the system estimates the distance between each runtime edgelet and corresponding normal plane, and then reweights each pair according to how well the transformed model points (as a whole) match the planes. Then, the system reestimates the pose based on these new weights, and in a subsequent step recomputes the weights based on the reestimated pose; and continues reestimating the pose and recomputing the weights until finally converging on a pose (or performing a maximum number of iterations).

While the present embodiment employs only weighting based on image feature distance, in alternate embodiments, weighting schemes based on more comprehensive parameters can be employed. In general, the individual runtime edgelet/model edgelet (normal plane/point) correspondences can be weighted according to certain match criteria, including:

(a) The image distance between each individual runtime edgelet/model edgelet (if the image distance exceeds twice the overall root-mean-square (RMS) image distance discrepancy of all runtime/image edgelets, then the system weights this correspondence as 0, and if the image distance discrepancy is between 1*RMS and 2*RMS, then the system linearly weights this correspondence as (1−(discrepancy−RMS)/RMS). If the image distance discrepancy is less than RMS image distance, then the weight should be 1;

(b) The image angular discrepancy between each individual runtime edgelet/model edgelet—for example, if the angular discrepancy is greater than 15 degrees, then the weight is 0; if the angular discrepancy is between 7.5 degrees and 15 degrees, then the weight is (1−angular discrepancy/7.5)/7.5); and if the angular discrepancy is less than 7.5 degrees, then the weight is 1; and (c) The correspondences are weighted by the distance from the camera—for example, model edgelets which are twice as far from their respective cameras are weighted to one-half (½).

For any of the above (or other) weighting schemes, all of the weight parameters are combined—for example a weighting of 0.64 due to image distance discrepancy, and a weighting of 0.5 due to image angular discrepancy, and a weighting of 0.5 due to distance from the camera all combine to form an overall weight of (0.64*0.5*0.5)=0.16.

Figure 9:
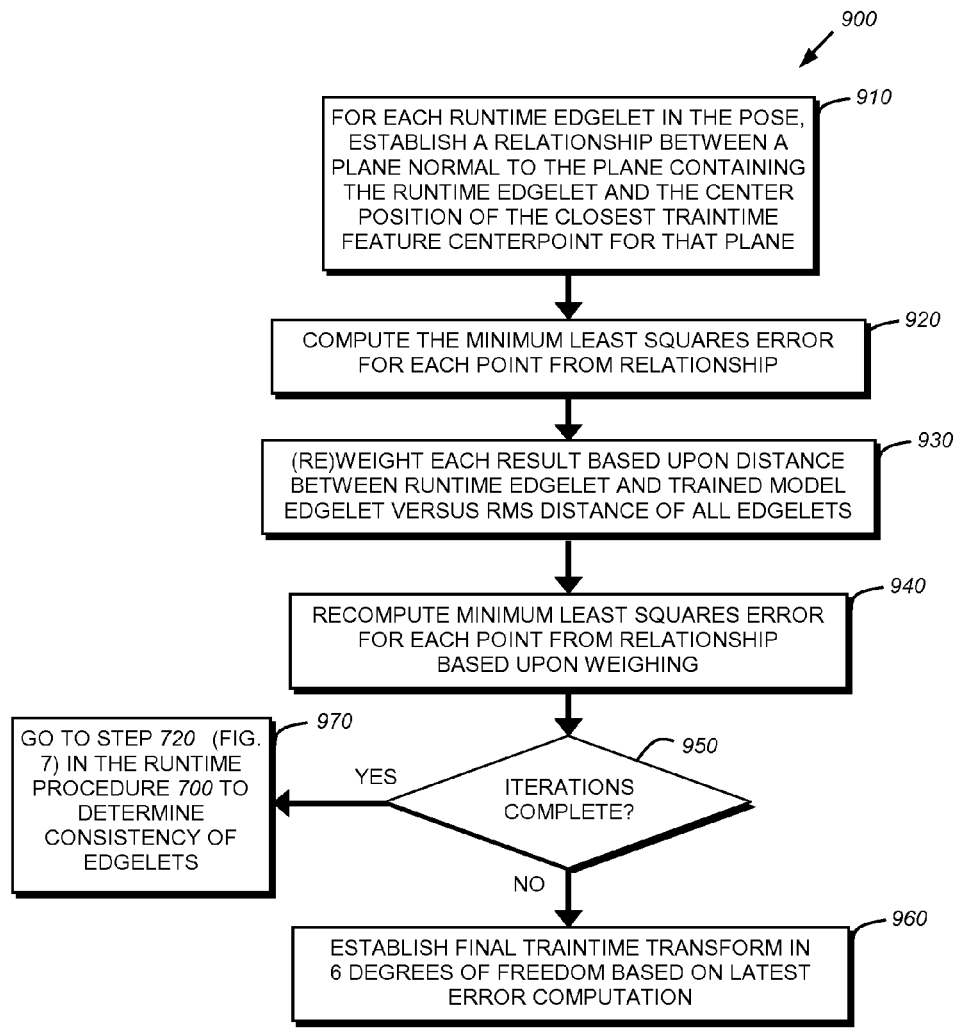
FIG. 9 is a flow diagram of a refinement procedure for deriving a final transformation in six degrees of freedom for the training features versus the runtime features using an iterative, weighted least squares error computation.

To summarize, FIG. 9 details a simplified flow diagram of the generalized procedure 900 for refining the transform between the trained model features the runtime features using a weighted least squares computation in accordance with an embodiment of this invention. First, in step 910, the procedure establishes a dot product result between the coordinates for the plane normal to the runtime edgelet-containing plane and the associated, closest traintime feature center point for that plane for each runtime feature. Next, the minimum least squares error (or any other acceptable statistical operation) for each result is computed using appropriate computational techniques (step 920). The results are then each weighted based upon the image distance discrepancy between the runtime and traintime edgelet versus the average (RMS) image discrepancy across all features/edgelets (step 930). As noted above, other weighting schemes can be employed. In step 940, the minimum least squares error is recomputed using the weighting of each point result from step 930. In decision step 950, the procedure 900 determines whether sufficient iterations have occurred. Typically four iterations should be sufficient, but the number of iterations is highly variable. If a sufficient number of iterations have not occurred, then the procedure branches back to step 720 in the edgelet correspondence and consistency procedure 700 of FIG. 7. All runtime edgelets are analyzed to determine their corresponding training features, and are also analyzed for relative consistency with respect to training features. When all edgelets have been included as consistent, or ignored, the procedure step 770 branches back to refinement procedure (900) step 910 and the next iteration of the procedure 900 occurs. When sufficient iterations have occurred, the decision step 950 branches to step 960, and the final six-degree-of-freedom transformation of the training pose is derived with which the runtime image is registered.

Given the complex and voluminous nature of the weighted sum square calculation, the system typically employs a publicly available symbolic mathematics software package (such as the popular Maple package from Waterloo Maple, Inc. of Canada) to compute the symbolic weighted error contributions automatically from the corresponding points and associated planes and also to generate source code which can be complied to run quickly on a computer. Then, at runtime, the expressions are instantiated from the sets of points and corresponding planes via the compiled computer-generated code, and then solved numerically using numerical routines which also include code which has been automatically generated from symbolic mathematics software. In operation, approximately four iterations will generate a transform of the runtime pose that is highly registered with respect to the training data.

The following is a more-detailed description of the procedure for estimating of the pose of a set of 3D model edgelets corresponding to a set of runtime image edgelets viewed from multiple cameras.

Stated again, each runtime image edgelet viewed from a previously calibrated camera (110, 112, and/or 114) corresponds to a plane in physical space. A point in the image corresponds to a line in physical space e.g. all of the points along the line which project to the same image coordinate. The edgelet in the image can be considered two endpoints, wherein each endpoint corresponds to a ray through the camera's origin and that endpoint on the image plane—which thereby corresponds to two discrete rays in physical space, and wherein the three points (i.e. the camera's origin and the two edgelet endpoints) span a plane.

The distance between a plane and a point is a linear function. The system characterizes the plane by the normal thereto and the distance from the origin as $(ax+by+cz=d)$. The squared distance between a given point and an associated normal plane is defined by the relationship $(ax+by+cz-d)^2$. The planes are fixed/determined by the runtime edges as described above, and the $(x, y, z)$ positions are the model positions transformed by the six-degree-of-freedom pose.

The squared error contribution $(ax+by+cz-d)^2$ can be weighted according to the distance between the point and the normal plane, and/or according to the orientation discrepancy between the model and runtime features. The discrepancy can also be scaled by the inverse of the distance from the camera (to characterize the perspective projection). The general form of a sum of squared error between fixed planes and corresponding points is a fourth order equation in a, b, c and a second order equation in tx, ty, tz. The pose can be solved with minimum error by finding the configuration for which the partial derivatives of the error function (with respect to the variables) is zero.

In particular, the pose can be solved using numerical methods. In order to improve runtime solver performance, the equation is made generic in terms of the monomial coefficients of the sum squared equation. As such, each model point mapped by the six-degree-of-freedom transform (a, b, c, d, tx, ty, tz) can be computed as follows:

$$\left(\begin{vmatrix} a^2+b^2-c^2-d^2 & 2bc-2ad & 2bd+2ac \\ 2bc+2ad & a^2-b^2+c^2-d^2 & 2bc-2ad \\ 2bd-2ac & 2bc+2ad & a^2-b^2-c^2+d^2 \end{vmatrix} \begin{vmatrix} M_x \\ M_y \\ M_z \end{vmatrix} + \begin{vmatrix} t_x(a^2+b^2+c^2+d^2) \\ t_y(a^2+b^2+c^2+d^2) \\ t_z(a^2+b^2+c^2+d^2) \end{vmatrix}\right)$$

Then, the sum squared error between a point and a fixed normal plane is:

$$\left(\begin{vmatrix} PlaneNorm_x \\ PlaneNorm_y \\ PlaneNorm_z \end{vmatrix} \begin{vmatrix} Mapped_x \\ Mapped_y \\ Mapped_z \end{vmatrix} - d\right)^2$$

Note that this expression is rational polynomial in tx, ty, tz, and a, b, c, d. In particular, it is quadratic in the variables tx, ty, and tz, and quartic in the variables a, b, c, d. In practice, a solution for this expression requires it to be divided by the sum of the squares of a, b, c and d. However, the solution in the illustrative embodiment computes only the numerator, and the denominator is taken into account when partial derivatives are computed for the expression by employing the quotient rule of differentiation. For a further description, refer to the COMMENT in the exemplary Maple code listing below. Consequently, this polynomial can be characterized by keeping track of the coefficients, and the equation can be generalized (made generic) using the tools in the publicly available MARS (a multi-polynomial system-solver environment) library implemented using the Maple-format computer-readable code described further below. This MARS library is publicly available via the World Wide Web from the Department of Computer Science at the University of North Carolina at the Web address www.cs.unc.edu/~geom/MARS/.

Next, the system computes C code functions from a standard library to update the generically-named coefficients (named, for example, atx0ty0tz0a1b1c1d1 to characterize the coefficient corresponding to the $tx^0 ty^0 tz^0 a^1 b^1 c^1 d^1$ term).

Then, the system solves for the pose with minimum error by finding the configuration for which the partial derivatives of the error function (with respect to each of the variables) is zero. An iterative numerical technique, such as the Levenberg-Marquardt Algorithm (LMA), can be used to solve for the roots of the system of partial derivatives.

An exemplary Maple-based program for deriving the weighted sum-squared error at each point is as follows:

```
with(linalg);
quatRot :=
    matrix(4,4,
        [[a*a+b*b-c*c-d*d,2*b*c-2*a*d,2*a*c+2*b*d,tx],
         [2*a*d+2*b*c,a*a-b*b+c*c-d*d,2*c*d-2*a*b,ty],
         [2*b*d-2*a*c,2*a*b+2*c*d,a*a-b*b-c*c+d*d,tz],
         [0,0,0,a*a+b*b+c*c+d*d]]);
val := matrix(1,4,[x,y,z,1]);
dot := matrix(1,4,[px,py,pz,pt]);
pos := multiply(quatRot,transpose(val));
unit := (a*a+b*b+c*c+d*d);
weightMat := multiply(dot,pos);
readlib(`C`);
read(`genericpoly2.map`);
genPoly:=
GenericPoly(expand(eval(weightMat[1,1]*weightMat[1,1])),
array(1..7,[a,b,c,d,tx,ty,tz]),'f');
COMMENT: Note that genPoly corresponds to the numerator of the rational algebraic
expression, and that it is supposed to be divided by unit*unit. We use the quotient rule of
differentiation to compute the overall derivative, which is (bottom*derivative(top) –
top*derivative(bottom))/(bottom*bottom), but since derivative(unit*unit) =
unit*2*derivative(unit), and since we are only interested in roots, we can factor out 1 unit
and ignore the denominator
genPolyDA := simplify(expand(unit*diff(eval(genPoly[1]),a)-eval(genPoly[1])*4*a));
genPolyDB := simplify(expand(unit*diff(eval(genPoly[1]),b)-eval(genPoly[1])*4*b));
genPolyDC := simplify(expand(unit*diff(eval(genPoly[1]),c)-eval(genPoly[1])*4*c));
genPolyDD := simplify(expand(unit*diff(eval(genPoly[1]),d)-eval(genPoly[1])*4*d));
genPolyDTX := simplify(expand(diff(eval(genPoly[1]),tx)));
genPolyDTY := simplify(expand(diff(eval(genPoly[1]),ty)));
genPolyDTZ := simplify(expand(diff(eval(genPoly[1]),tz)));
```

The following function ptRayGenericPoly_addToValsWeighted(ptRayGenericPoly( ) is used to update the coefficients based upon a 3D model point (x, y, z) and a plane (corresponding to an image edgelet viewed by a camera: px, py, pz, pt), and the contribution corresponding to this 3D model point and corresponding plane are weighted by the given weight:
void ptRayGenericPoly_addToValsWeighted(ptRayGenericPoly*vals,
  double x,
  double y, double z,
  double px,
  double py,
  double pz,
  double pt,
  double weight)
The resulting code generated by Maple based upon the above program expression is used by the processor to solve the weighted least squares computation in accordance with an embodiment of this invention. The code is conventional and is omitted for brevity.

VIII. Coverage Measurement

PatMax 2D provides a coverage measure for each result. This coverage expresses how much of the traintime model is explained by the runtime data. It is contemplated that the illustrative embodiment can also provide a coverage measurement using conventional techniques applicable in a 2D vision system. Generally, coverage refers to the fraction of traintime edges that are matched by the runtime edges. However, the "coverage" of a particular traintime edge is defined as the computed weighting of that correspondence between the traintime edge and the corresponding runtime edge. Additionally, it is contemplated that the illustrative embodiment (like PatMax 2D) computes the coverage by "shmearing" the coverage along the traintime chains of points/edgelets. In other words, if a traintime edgelet along a chain has a weight of 1.0, then both traintime edgelet neighbors (along the chain) are granted a weight of 1.0 (or more generally, the maximum weight of either of the traintime edgelet's neighbors). The reason for this "shmearing" is that edges are not always sampled evenly—a line segment at traintime might correspond to 10 traintime edges, but at runtime, that edge may be further from the camera, and may only correspond to 8 runtime edges. Without "shmearing", the coverage would be 0.8 (because there are only 8 runtime edges to match 10 traintime edges), even though the line was completely seen in the runtime image.

Note that the amount of "shmearing" the amount of shmearing applied to the coverage analysis can be analytically determined by the angle between the model features and the camera, such that if the object's pose significantly foreshortens a particular set of model features, then a single model feature in that set may shmear its coverage to neighboring model features which are more than one edgelet removed from the covered model feature.

IX. Other Considerations

Unlike certain competing approaches to 3D registration, it should be clear that this approach has increased efficiencies, accuracy and robustness in that it is based on use of edges in the training and runtime images, rather than upon triangulation of computed 2D image locations, particularly where the 2D image locations were computed by registering a pattern or model in the image. This approach also employs direct computational methods such as least squares optimization. Moreover, the illustrative invention can make use of silhouette-based approaches as discussed briefly above.

Such silhouette-based approaches involve the use of multiple (possibly hundreds or thousands) images of the part are acquired at different poses, and from which the image silhouettes are extracted and stored in memory as traintime image silhouettes in association with relevant position information. At runtime, the runtime silhouette is acquired, and is matched to all of the traintime silhouettes. The best-matching training silhouette provides coarse-alignment with that traintime silhouette's pose information used to provide the coarse pose from which transforms are derived as described above.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the use of an iterative, weighted least squares calculation for refinement of the pose is only one of a variety of possible techniques for refining the transformation between the trained features and the runtime features. Other statistical techniques for minimizing error are expressly contemplated. Likewise, it should be clear that the procedures described herein can be implemented in hardware, software, consisting of program instructions executing on a computer processor or a combination of hardware and software. Accordingly, this description is meant to be taken only by way of example, and not to otherwise limit the scope of this invention.

What is claimed is:

1. A method for registering an object in three dimensions using machine vision comprising the steps of:
   at training time, acquiring training images of an object used for training with one or more cameras;
   at runtime, acquiring runtime images of an object to be registered at runtime with the one or more cameras; and
   determining a three dimensional pose transformation between the pose of the object used at training time and the pose of the object to be registered at runtime by
   (a) defining features in each of the runtime images as three-dimensional rays through an origin of each of the one or more camera's, respectively,
   (b) associating the three-dimensional rays with corresponding runtime features from the training images, and
   (c) computing an optimal pose estimate which maps the training features onto the corresponding three-dimensional rays of runtime features using iterative, reweighted least squares analysis.

2. The method as set forth in claim 1 wherein the step of acquiring training images includes acquiring at least two poses of at least one training planar face of the object used for training, the at least one training planar face being located within a defined training subwindow of a field of view of the one or more cameras, the training subwindow including spatial coordinates.

3. The method as set forth in claim 1 wherein the step of computing the optimal pose comprises for each of the runtime features, establishing a plane normal to a plane passing through each of the runtime features and a corresponding ray from an origin of the one or more cameras, and minimizing a sum squared error of a dot product between the plane normal and a center point of the one of the closest training features associated with the plane passing through the respective of the runtime features.

4. The method as set forth claim 3 wherein the step using the iterative, reweighted least squares analysis includes changing a weighting with respect to each of the runtime features based upon an error for that runtime feature versus an averaged error for all runtime features.

5. The method as set forth in claim 4 wherein the averaged area is based upon a root-mean-square error.

6. A method for registering an object in three dimensions using machine vision comprising the steps of:
   at training time, acquiring training images of an object used for training with one or more cameras;
   at runtime, acquiring runtime images of an object to be registered at runtime with the one or more cameras; and
   determining a three dimensional pose transformation between the pose of the object used training time and the pose of the object to be registered at runtime by
   (a) defining features in each of the runtime images as three-dimensional rays through an origin of each of the one or more camera's, respectively, (b) associating the three-dimensional rays with corresponding runtime features from the training images, and (c) computing an optimal pose estimate which maps the training features onto the corresponding three-dimensional rays of runtime features using iterative, reweighted least squares analysis;

wherein the step of acquiring training images includes acquiring at least two poses of at least one training planar face of the object used for training, the at least one training planar face being located within a defined training subwindow of a field of view of the one or more cameras, the training subwindow including spatial coordinates;

wherein the step of acquiring runtime images includes, determining candidate features representative of at least one runtime planar face in the runtime image data that correspond to the at least one training planar face and associating positions in three-dimensions of the spatial coordinates of the training subwindow with a spatially reoriented version of each of the at least one runtime planar face that corresponds with the at least one training planar face.

7. A system for registering an object in three dimensions using machine vision comprising:

one or more cameras constructed and arranged so that, at training time, the one or more cameras each acquire training images of an object used for training, and at runtime, the one or more cameras acquire runtime images of an object to be registered at runtime with the one or more cameras; and a pose transformation determination process that computes a three-dimensional pose transformation between the pose of the object used training time and the pose of the object to be registered at runtime by (a) defining features in each of the runtime images as three-dimensional rays through an origin of each of the one or more camera's, respectively, (b) associating the three-dimensional rays with corresponding runtime features from the training images, and (c) computing an optimal pose estimate which maps the training features onto the corresponding three-dimensional rays of runtime features using iterative, reweighted least squares analysis.

8. The system as set forth in claim 7 wherein the pose transformation determination process is constructed and arranged to acquire at least two poses of at least one training planar face of the object used for training, the at least one training planar face being located within a defined training subwindow of a field of view of the one or more cameras, the training subwindow including spatial coordinates.

9. The system as set forth in claim 7 wherein the pose transformation determination process is constructed and arranged to compute the optimal pose by, for each of the runtime features, establishing a plane normal to a plane passing through each of the runtime features and a corresponding ray from an origin of the one or more cameras, and minimizing a sum squared error of a dot product between the plane normal and a center point of the one of the closest training features associated with the plane passing through the respective of the runtime features.

10. The system as set forth claim 9 wherein the pose transformation determination process is constructed and arranged to change a weighting with respect to each of the runtime features based upon an error for that runtime feature versus an averaged error for all runtime features.

11. The system as set forth in claim 10 wherein the averaged area is based upon a root-mean-square error.

12. A system for registering an object in three dimensions using machine vision comprising:

one or more cameras constructed and arranged so that, at training time, the one or more cameras each acquire training images of an object used for training, and at runtime, the one or more cameras acquire runtime images of an object to be registered at runtime with the one or more cameras; and a pose transformation determination process that computes a three-dimensional pose transformation between the pose of the object used training time and the pose of the object to be registered at runtime by (a) defining features in each of the runtime images as three-dimensional rays through an origin of each of the one or more camera's, respectively, (b) associating the three-dimensional rays with corresponding runtime features from the training images, and (c) computing an optimal pose estimate which maps the training features onto the corresponding three-dimensional rays of runtime features using iterative, reweighted least squares analysis;

wherein the pose transformation determination process is constructed and arranged to acquire at least two poses of at least one training planar face of the object used for training, the at least one training planar face being located within a defined training subwindow of a field of view of the one or more cameras, the training subwindow including spatial coordinates;

wherein the pose transformation determination process is constructed and arranged to determine candidate features representative of at least one runtime planar face in the runtime image data that correspond to the at least one training planar face and associating positions in three-dimensions of the spatial coordinates of the training subwindow with a spatially reoriented version of each of the at least one runtime planar face that corresponds with the at least one training planar face.

13. A non-transitory computer-readable medium containing executable program instructions, which when executed by the computer perform the steps of registering an object in three dimensions using machine vision, the executable program instructions comprising program instructions for:

at training time, acquiring training images of an object used for training with one or more cameras;

at runtime, acquiring runtime images of an object to be registered at runtime with the one or more cameras; and determining a three dimensional pose transformation between the pose of the object used training time and the pose of the object to be registered at runtime by (a) defining features in each of the runtime images as three-dimensional rays through an origin of each of the one or more camera's, respectively, (b) associating the three-dimensional rays with corresponding runtime features from the training images, and (c) computing an optimal pose estimate which maps the training features onto the corresponding three-dimensional rays of runtime features using iterative, reweighted least squares analysis.

* * * * *